United States Patent
Miyahara et al.

(12) 
(10) Patent No.: US 7,562,737 B2
(45) Date of Patent: Jul. 21, 2009

(54) VEHICULAR POWER UNIT SUPPORTING APPARATUS

(75) Inventors: Tetsuya Miyahara, Saitama (JP);
Tatsuhide Sakai, Saitama (JP);
Masafumi Kyuse, Saitama (JP);
Mutsuru Ozaki, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 11/799,712

(22) Filed: May 2, 2007

(65) Prior Publication Data
US 2007/0260377 A1    Nov. 8, 2007

(30) Foreign Application Priority Data
May 8, 2006    (JP)    ............... 2006-129303

(51) Int. Cl.
*B60K 1/00*    (2006.01)
(52) U.S. Cl. ................. 180/291; 180/296; 180/299; 180/300
(58) Field of Classification Search .......... 180/291–300
See application file for complete search history.

(56) References Cited

U.S. PATENT DOCUMENTS 4,773,634 A * 9/1988 Hamaekers ............... 267/219
5,035,296 A   7/1991 Sjostrand
5,460,552 A * 10/1995 Blanchard et al. ......... 440/38
2004/0046450 A1 * 3/2004 Yoshida et al. ............. 307/10.1

FOREIGN PATENT DOCUMENTS

| DE | 102 23 517 A1 | 12/2002 |
| JP | 02-175330 | 7/1990 |
| JP | 3503035 T | 7/1991 |
| JP | 11-278063 | 10/1999 |
| JP | 2004-148843 | 5/2004 |

* cited by examiner

*Primary Examiner*—Christopher P Ellis
*Assistant Examiner*—Katy Meyer
(74) *Attorney, Agent, or Firm*—Carrier, Blackman & Associates, P.C.; Joseph P. Carrier; William D. Blackman

(57) ABSTRACT

A vehicle power unit supporting apparatus supports a transversely-mounted power unit having a power source and a speed reduction gear connected to each other. The power unit is supported on a vehicle body by at least a power-source-side mount and a speed-reduction-gear side mount on both of the left and right sides in the vehicle width direction. These mounts are disposed at a position higher than a position of the center of gravity of the power unit. Spring axis lines of the power-source side mount and the speed-reduction-gear side mount are inclined to intersect with each other at a position higher than the position of the center of gravity of the power unit when the vehicle is viewed from the front. An elastic center of the entire power unit supporting apparatus is located at a position lower than the position of the center of gravity of the power unit.

20 Claims, 11 Drawing Sheets

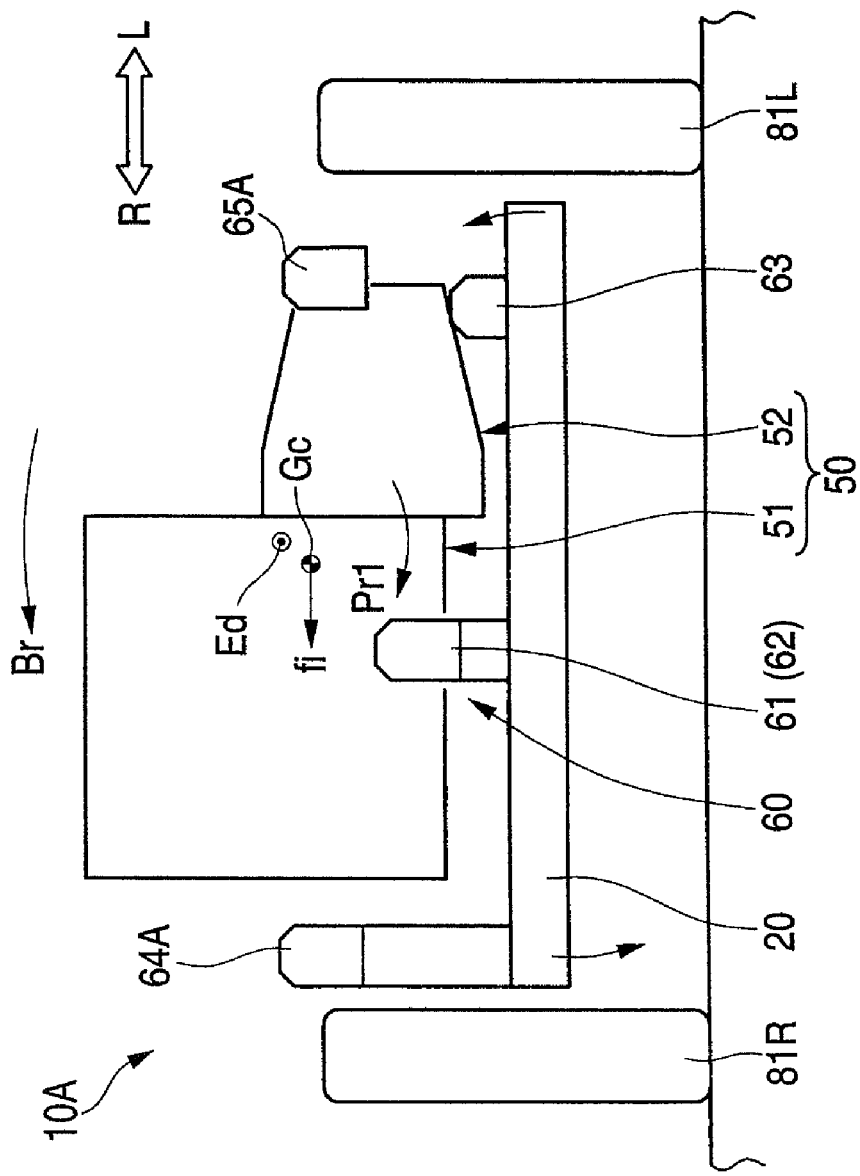

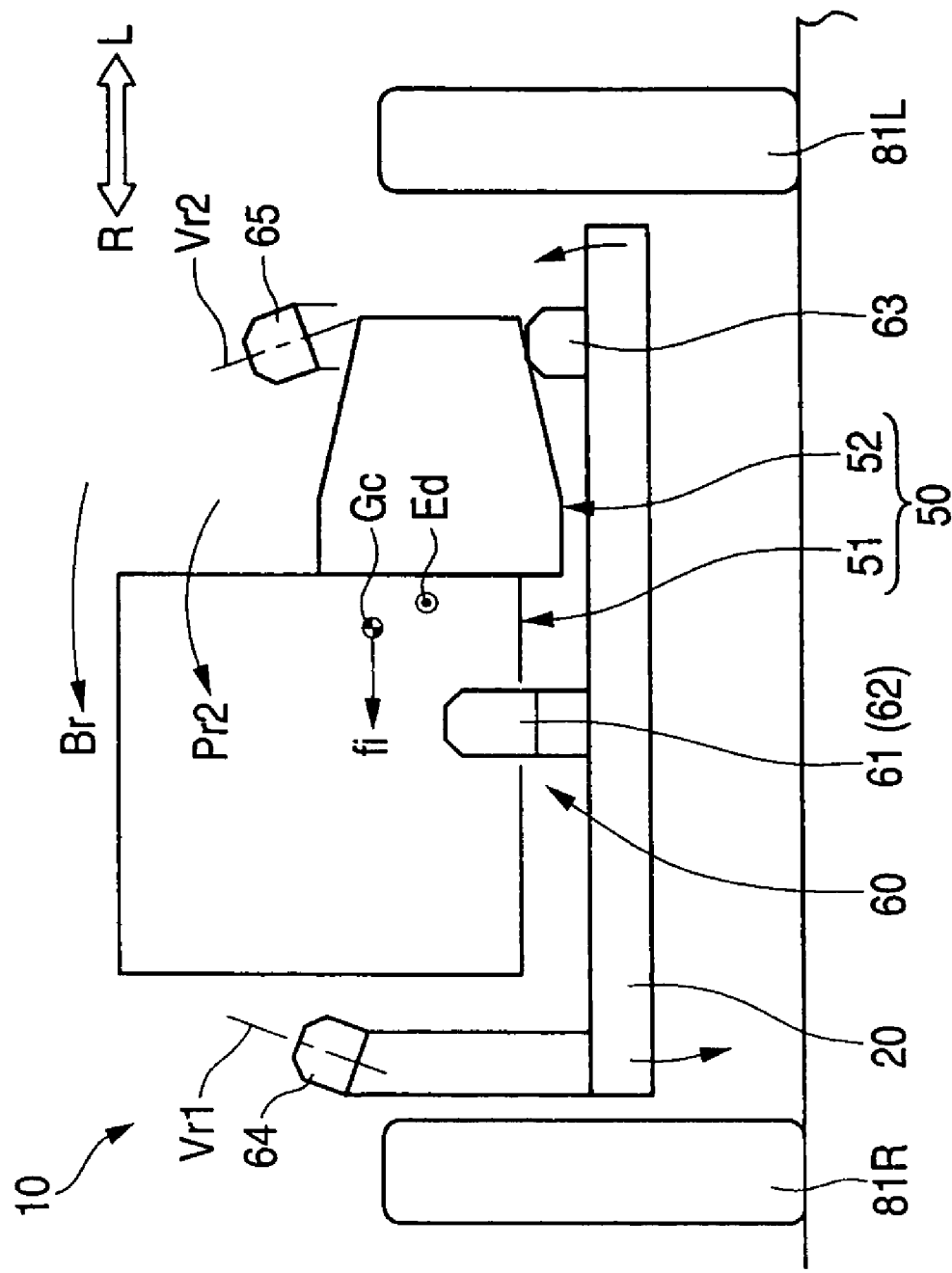

PRIOR ART

PRIOR ART

VEHICULAR POWER UNIT SUPPORTING APPARATUS

BACKGROUND OF THE INVENTION

1. Field of the Invention

The present invention relates to a power unit supporting apparatus configured to mount a power unit having a configuration in which a speed reduction gear is connected to an end of a power source such as an engine, on a vehicle body.

2. Description of Related Art

Common vehicle power units include longitudinally-mounted power units and transversely-mounted power units. The longitudinally-mounted power unit has a configuration in which a power source and a speed reduction gear are arranged in a front-rear direction of a vehicle body and are connected to each other.

On the other hand, the transversely-mounted power unit has a configuration in which a power source and a speed reduction gear are arranged in a vehicle width direction. The transversely-mounted power unit is constituted by, for example, extending an engine crankshaft in the vehicle width direction and also connecting an input shaft of a transmission serving as a speed reduction gear to an end of the extended crankshaft. The transversely-mounted power unit is accommodated in a power unit accommodating chamber (or engine room) of the vehicle. Thus, the length in the front-rear direction of the power unit accommodating chamber can be reduced.

Various kinds of power unit supporting apparatuses for mounting such a transversely-mounted power unit on a vehicle body are known (see, for example, Japanese Patent Unexamined Publication No. JP-A-2004-148843).

A conventional vehicle power unit supporting apparatus of JP-A-2004-148843 is described below with reference to FIGS. 9A and 9B. FIGS. 9A and 9B are explanatory views illustrating the conventional vehicle power unit supporting apparatus. FIG. 9A illustrates a planar configuration of each of the vehicle power unit and the power unit supporting apparatus. FIG. 9B illustrates a rear configuration of each of the vehicle power unit and the power unit supporting apparatus.

The conventional vehicle power unit supporting apparatus 200 is constructed as follows. That is, a transversely-mounted power unit 203 having a configuration, in which an engine 201 and a transmission 202 are arranged in a vehicle width direction and are connected to each other, is mounted on a vehicle body 205 through a subframe 204.

More specifically, a front mount 212, a rear mount 213, and a transmission lower mount (not shown) are attached to the subframe 204 at a position lower than the position of the center 211 of gravity of the engine 201. Consequently, these mounts can receive the static load of the power unit 203.

Also, the power unit 203 can be supported by left-side and right-side mounts (i.e., a side engine mount 214 and a transmission upper mount 215), which are attached to the vehicle body 205 at positions higher than the position of the center 211 of gravity of the engine 201.

Meanwhile, to enhance the driving stability and the riding comfort of the vehicle 200, it is requested not only to suppress vibrations of the power unit 203 from being transmitted to the vehicle body 205 but to prevent the behavior of the power unit 203 from affecting the vehicle body 205.

For example, when the vehicle 200 is turned to the left or right, a centrifugal force is applied to the vehicle 200 during the turn thereof. At that time, the centrifugal force is also applied to the power unit 203. To sufficiently enhance the driving stability and the riding comfort of the vehicle 200, it is preferable to suppress the influence of the behavior of the power unit 203 serving as a heavy load on the vehicle body 205.

SUMMARY OF THE INVENTION

A problem that the invention is to solve is to provide a technique of enhancing the driving stability and the riding comfort of a vehicle to a vehicle power unit supporting apparatus.

According to a first aspect of the invention, there is provided a vehicle power unit supporting apparatus that supports a power unit, which is accommodated in a power unit accommodating chamber of a vehicle and has a configuration in which a speed reduction gear is connected to an end of a power source, the supporting apparatus comprising:
left and right side mounts respectively disposed on both sides in a vehicle width direction of the power unit at a position higher than a position of a center of gravity of the power unit,
wherein
a spring axis line of the left side mount and a spring axis line of the right side mount are inclined to intersect with each other at a position higher than the position of the center of gravity of the power unit when the vehicle is viewed from front, and
an elastic center of the entirety of the power unit supporting apparatus is set to be lower than the position of the center of gravity.

According to a second aspect of the invention, as set forth in the first aspect of the invention, it is preferable that the power source and the speed reduction gear are arranged in the vehicle width direction and are connected to each other.

According to a first aspect of the invention, the vehicle power unit supporting apparatus has a simple configuration in which a spring axis line of the left side mount and a spring axis line of the right side mount are inclined to intersect with each other at a position higher than the position of the center of gravity of the power unit when the vehicle is viewed from front. Consequently, the elastic center of the entire power unit supporting apparatus can be freely set at an optimal height. Accordingly, the elastic center of the entire power unit supporting apparatus can be downwardly moved and also can be set at a position lower than the position of the center of gravity of the power unit.

Thus, for example, when a vehicle is turned, the direction of a moment due to the centrifugal force applied to the power unit 60 can be adjusted to a rolling direction in which a vehicle body is rolled (i.e., a direction of a rolling movement around a front-back axis of the vehicle body). Consequently, the rolling direction of the power unit can be adjusted to the rolling direction of the vehicle body. Accordingly, there is no effect of canceling the rolling of the vehicle body by the rolling of the power unit. Thus, while the vehicle moves, the influence of the behavior of the power unit serving as a heavy load on the vehicle body can be suppressed. Consequently, the driving stability of the vehicle can be further enhanced. Also, the riding comfort thereof can be further enhanced.

According to the second aspect of the invention, the power source and the speed reduction gear are arranged in the vehicle width direction and are connected to each other, that is, what is called the transversely-mounted power unit is mounted on the vehicle body.

Generally, in a case where a transversely-mounted power unit is mounted on a vehicle, a load applied to an axle, on which the power unit is disposed, between front and rear axles is larger than a load applied to the other axle (i.e., the load is concentrated on the axle on which the power unit is disposed), as compared with a case where a longitudinally-mounted power unit is mounted thereon. The behavior of the power unit affects the vehicle body and also affects the axles through suspensions. Therefore, the load concentration affects the driving stability of the vehicle. driving stability of the vehicle.

In contrast, according to the second aspect of the invention, even in a case where a transversely-mounted power unit is mounted on a vehicle, the rolling direction of the power unit can be adjusted to that of the vehicle body. Thus, the driving stability of the vehicle can be further enhanced.

BRIEF DESCRIPTION OF THE DRAWINGS

FIG. 8A is a view illustrating an operation of a vehicle having the power unit supporting apparatus according to a conventional example;

FIG. 8B is a view illustrating an operation of a vehicle having the power unit supporting apparatus according to an illustrative embodiment of the present invention;

DETAILED DESCRIPTION OF EXEMPLARY EMBODIMENTS OF THE INVENTION EMBODIMENTS

Figure 1:
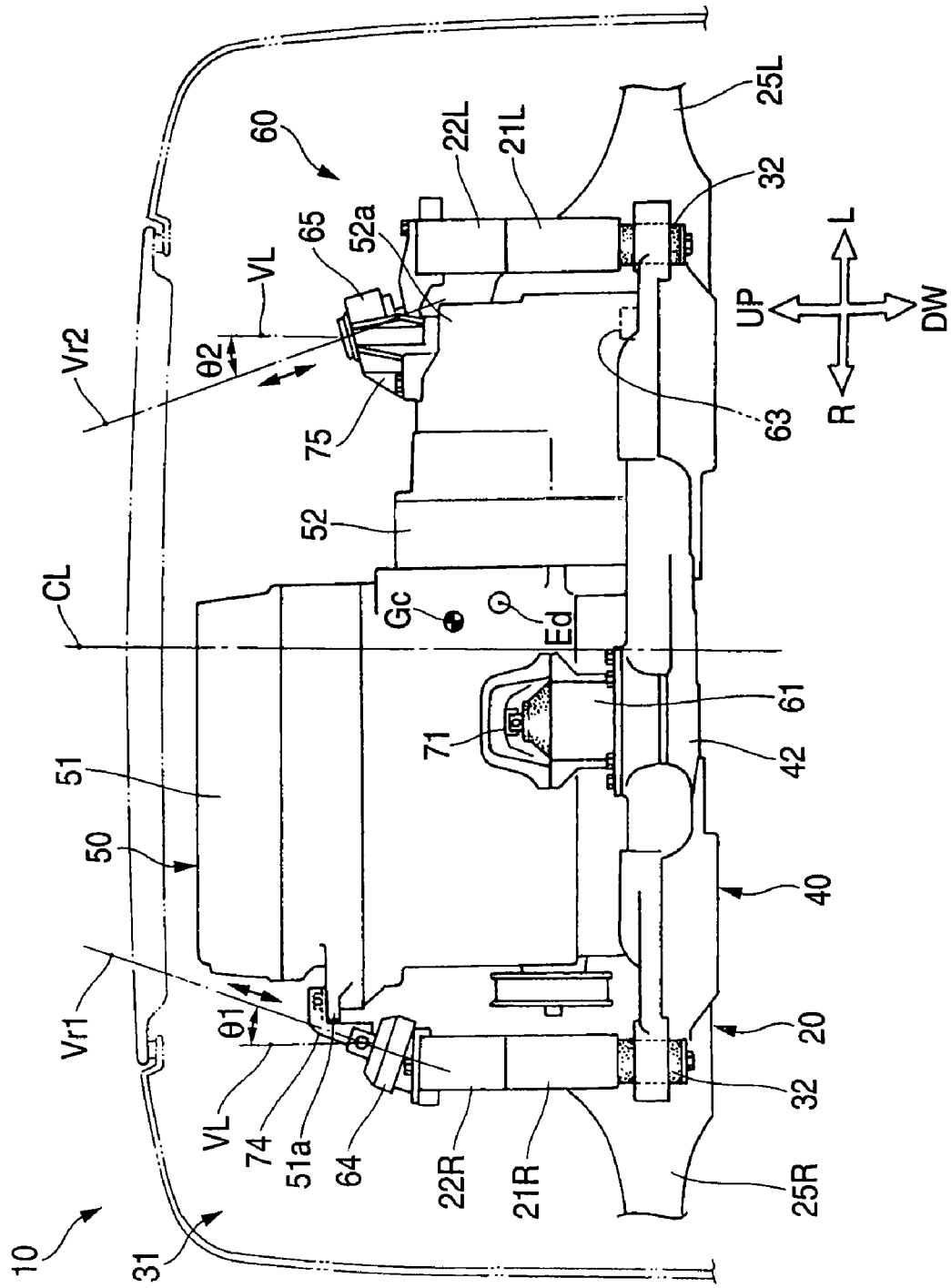
FIG. 1 is a front view illustrating a vehicle front portion and a vehicle power unit supporting apparatus according to the invention.

A best mode for carrying out the invention is described below with reference to the accompanying drawings. Incidentally, in the following description, the expressions "front", "rear", "left", "right", "upward", and "downward" directions represent those determined with respect to a driver. Reference character "Fr" designates a front side, reference character "Rr" denotes a rear side, reference character "L" represents a left side, reference character "R" designates a right side, reference character "Up" denotes an upper side, reference character "Dw" represents a lower side, and reference character "CL" designates a vehicle width center (i.e., a vehicle body center, or a vehicle width center line).

Figure 2:
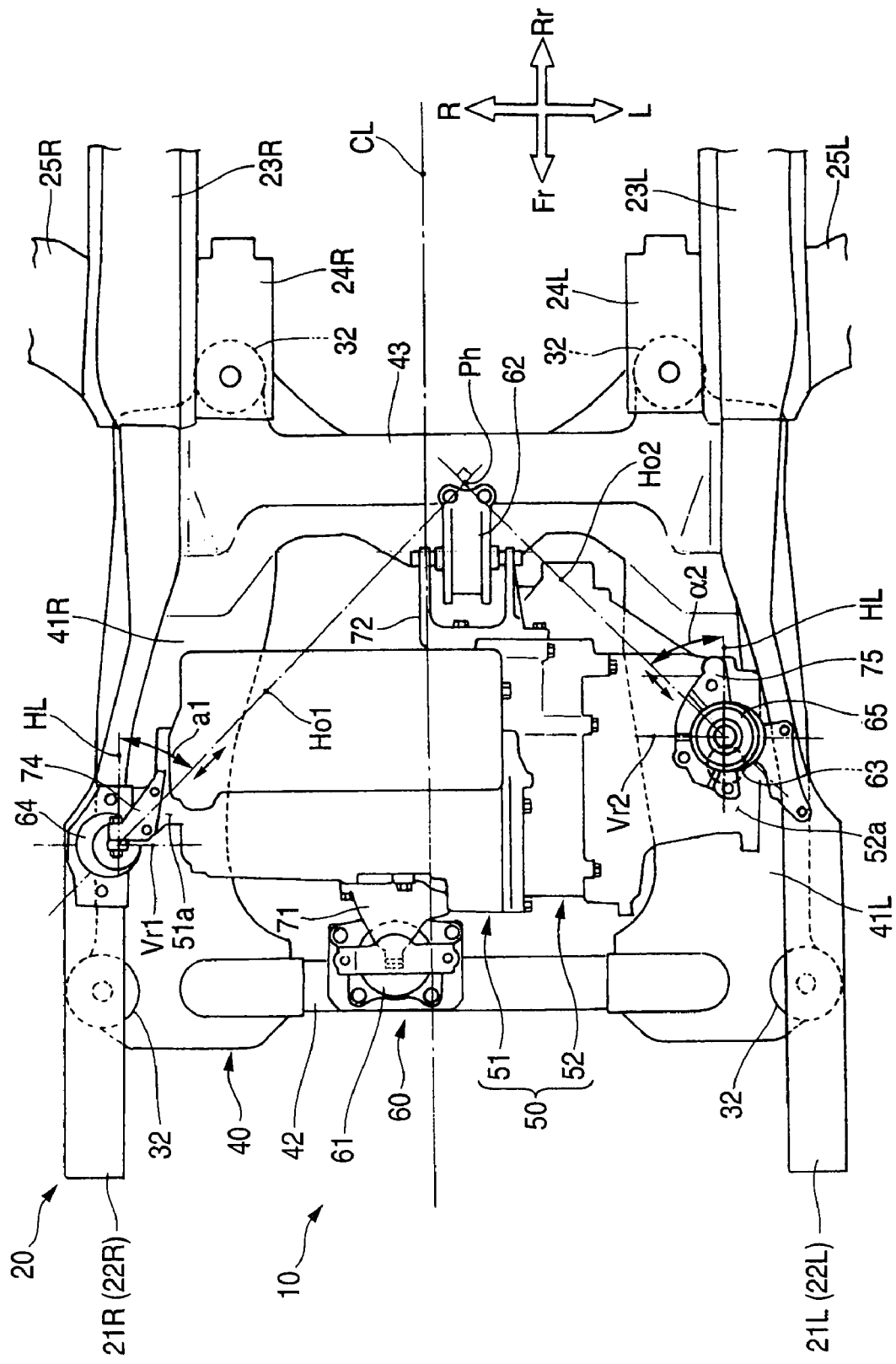
FIG. 2 is a plan view illustrating the vehicle front portion and the vehicle power unit supporting apparatus according to the invention.
Figure 3:
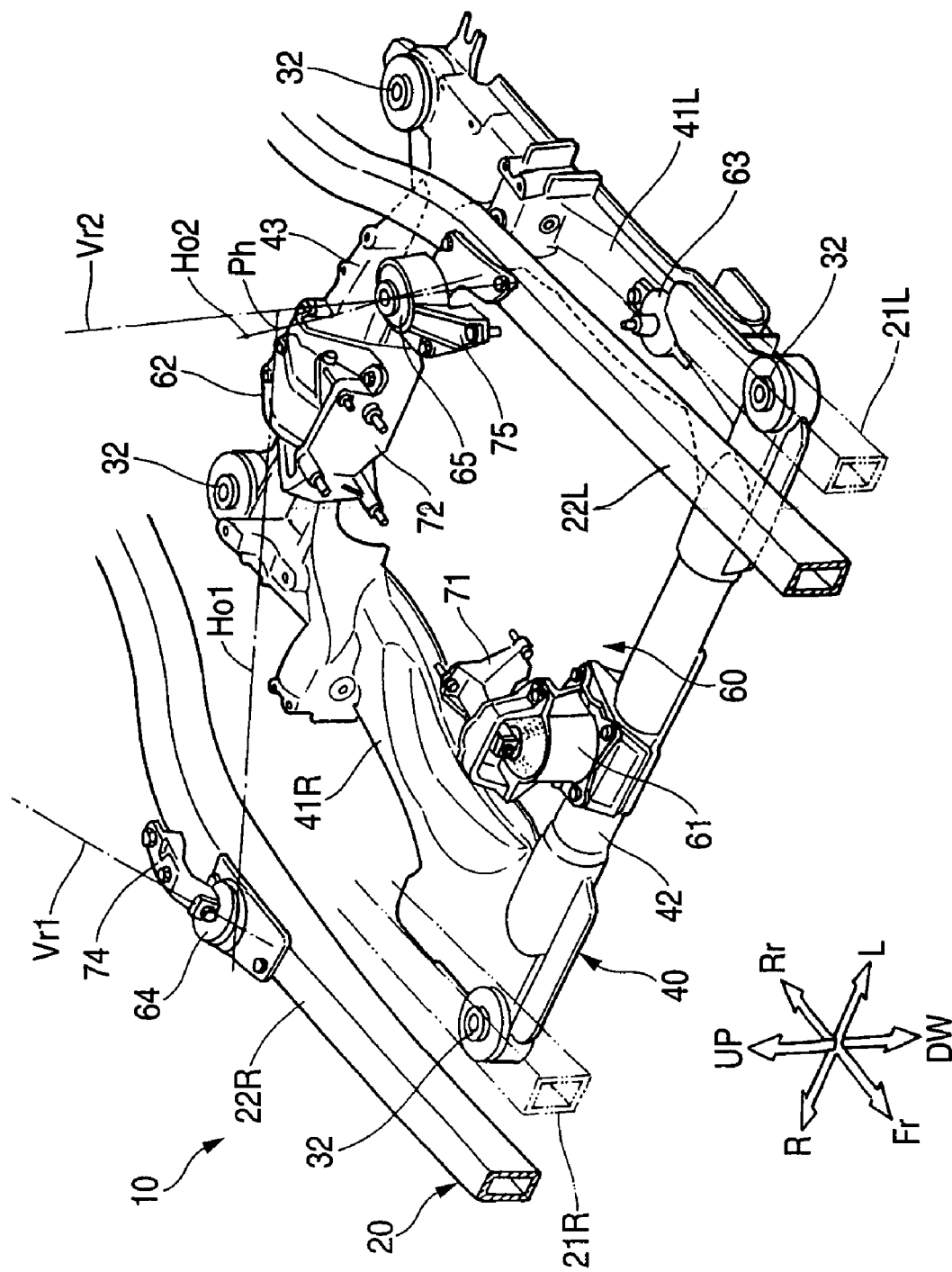
FIG. 3 is a perspective view illustrating the vehicle front portion and the vehicle power unit supporting apparatus according to the invention.

FIG. 1 is a front view illustrating a vehicle front portion and a vehicle power unit supporting apparatus according to the invention. FIG. 2 is a plan view illustrating the vehicle front portion and the vehicle power unit supporting apparatus according to the invention. FIG. 3 is a perspective view illustrating the vehicle front portion and the vehicle power unit supporting apparatus according to the invention.

As illustrated in FIGS. 1 and 2, a vehicle 10 is an automobile called a front-engine front-drive car employing a drive system configured so that a power unit 50 is accommodated in a power unit accommodating chamber 31 (corresponding to an engine room 31 shown in FIG. 1) provided in a front portion of a vehicle body 20, and that front wheels (not shown) are driven by an engine 51 of the power unit 50.

Incidentally, the vehicle 10 can be a front-engine rear-drive car configured so that rear wheels are driven by the engine 51, or can be a four-wheel-drive car employing a drive system configured so that rear wheels are driven by the engine 51.

A front portion of a vehicle body 20 is a vehicle body frame including left and right front side frames 21L and 21R extending in a front-rear direction, left and right upper frames 22L and 22R respectively extending in the front-rear direction above the left and right front side frames 21L and 21R, and left and right floor frames 23L and 23R extending rearwardly from the rear end portions of the left and right front side frames 21L and 21R as main composing members. Each of the left and right front side frames 21L and 21R has an associated one of brackets 24L and 24R on an inner side surface of a rear end portion thereof (see FIG. 2). Reference numerals 25L and 25R denote side outriggers.

Such a vehicle body 20 is configured so that front subframes 40 are hanged from the front portions of the left and right front side frames 21L and 21R and the left and right brackets 24L and 24R through front, rear, left, and right antivibration elastic bushings 32, 32, . . . , respectively, as illustrated in FIGS. 1 to 3.

The front subframe 40 extends in the front-rear direction and has a substantially rectangular shape in plan view. The front subframe 40 has left and right longitudinal members 41L and 41R extending in the front-rear direction of the vehicle body 20, a front portion lateral member 42 extending in the lateral direction of the vehicle body 20 to be spanned between the front ends of the longitudinal members 41L and 41R, and a rear portion lateral member 43 extending in the lateral direction of the vehicle body 20 to be spanned between the rear ends of the left and right longitudinal members 41L and 41R.

A front suspension (not shown) and a steering gear box (not shown) can be attached to the front subframe 40. Such a front subframe 40 is a part of the vehicle body 20. It is assumed that in a case where no particular description is given, the vehicle body 20 includes the front subframe 40.

As illustrated in FIGS. 1 and 2, the power unit 50 is what is called a transversely-mounted power unit in which the right side engine 51 and the left side transmission 52 are arranged in the vehicle width direction and are connected to each other, that is, the transmission 52 is connected to an end of the engine 51. The engine 51 is a power source whose output shaft is directed in the vehicle width direction. The transmission 52 has an input shaft connected to the output shaft of the engine 51 through a clutch and serves as both of a speed reduction gear and a speed change gear.

The transversely-mounted power unit 50 can be mounted on the vehicle body 20 by a power unit supporting apparatus 60.

As illustrated in FIGS. 1 to 3, the power unit supporting apparatus 60 has a power source front lower portion side mount 61, a power source rear portion side mount 62, a speed-reduction-gear side lower side mount 63, a power-source side mount 64, and a speed-reduction-gear side mount 65.

The power source front portion side mount 61, the power source rear portion side mount 62, and the speed-reduction-gear side lower side mount 63 are disposed at positions lower than the position of the center Gc (see FIG. 1) of the power unit 50, and support the static load of the power unit 50. That is, the mounts 61, 62, and 63 are static load supporting mounts for supporting the weight thereof.

On the other hand, the power-source side mount 64 and the speed-reduction-gear side mount 65 are support members disposed at positions higher than the position of the center Gc (see FIG. 1) of the power unit 50. The mounts 64 and 65 do not support or substantially do not support the static load of the power unit 50. That is, the power-source side mount 64 is a support member disposed at an end portion 51a of the engine (corresponding to the power source) 51 (i.e., the power source), which is opposite to the transmission 52 (i.e., the speed reduction gear). The speed-reduction-gear side mount 65 is a support member disposed at an end portion 52a of the transmission 52 (i.e., the speed reduction gear), which is opposite to the engine 51.

The power source front lower portion side mount 61 is a member attached to the front portion lateral member 42 of the front subframe 40 at the bottom portion thereof in the vicinity of the vehicle width center CL to support the front lower portion of the engine 51 through the engine bracket 71. The power source front lower portion side mount 61 is, for example, a one-way liquid sealed engine mount having a damping axis line extending in an up-down direction.

The power source rear lower portion side mount 62 is a member attached to the rear portion lateral member 43 of the front subframe 40 at the bottom portion thereof in the vicinity of the vehicle width center CL to support the rear lower portion of the engine 51 through an engine bracket 72. The power source rear lower portion side mount 62 is, for example, a rubber mount.

The speed-reduction-gear side lower side mount 63 is a member attached to the left longitudinal member 41L of the front subframe 40 at the bottom portion thereof to support the left lower portion of the transmission 52 through a speed-reduction-gear bracket (not shown). The speed-reduction-gear side lower side mount 63 is, for example, a rubber mount.

The power-source side mount 64 is a right side mount attached to the right upper frame 22R at the bottom portion thereof to support the right upper portion 51a of the engine 51 (i.e., the end portion 51a of the engine 51, which is opposite to the transmission 52) through the engine bracket 74.

The speed-reduction-gear side mount 65 is a left side mount attached to the right upper frame 22R at the bottom portion thereof to support the right upper portion 52a of the transmission 52 (i.e., the end portion 52a of the transmission 52, which is opposite to the engine 51) through a speed-reduction-gear bracket 75.

Figure 4:
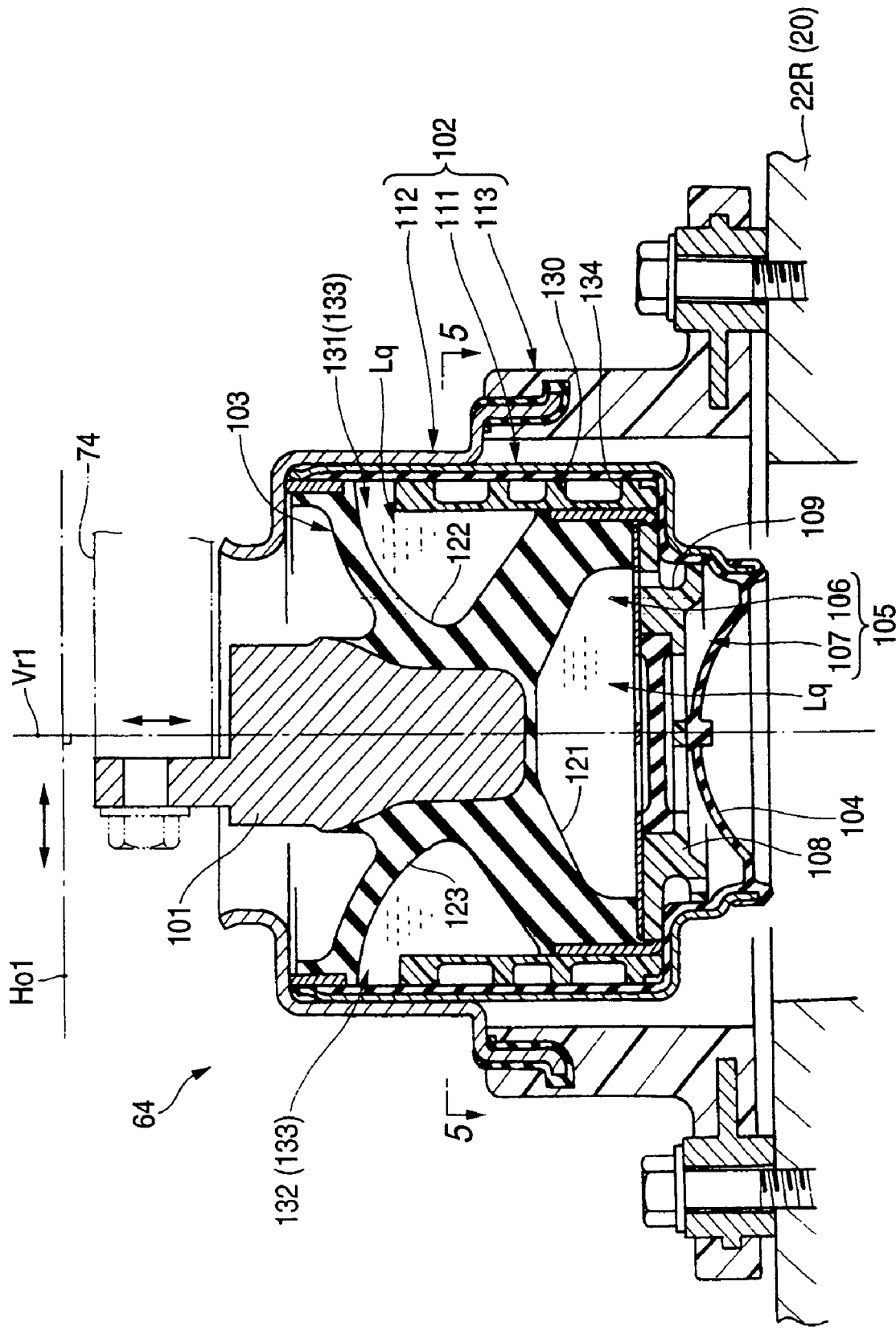
FIG. 4 is a cross-sectional view illustrating a power-source side mount according to the invention.
Figure 5:
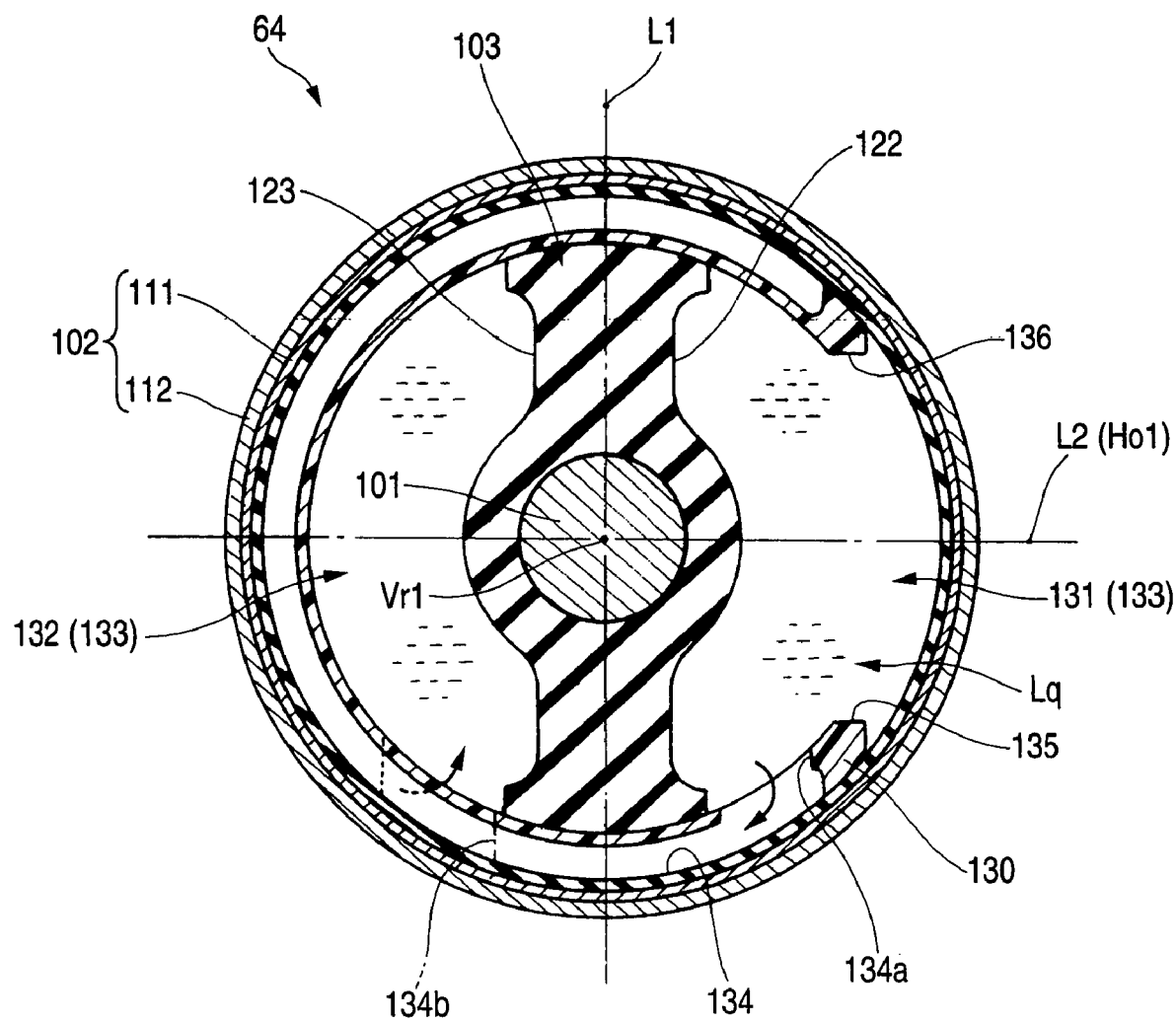
FIG. 5 is a cross-sectional view taken along line 5-5 shown in FIG. 4.

Next, the detailed configuration of the power-source side mount 64 is described below. FIG. 4 is a cross-sectional view illustrating the power-source side mount according to the invention. FIG. 5 is a cross-sectional view taken along line 5-5 shown in FIG. 4.

As shown in FIGS. 4 and 5, the power-source side mount 64 is disposed between the vehicle body 20 and the engine 51 (see FIG. 1) and is an antivibration support mechanism for supporting the engine 51 while preventing the vibration of the engine 51. The power-source side mount 64 has the functions of a two-way liquid sealed mount. Therefore, the power-source side mount 64 has a predetermined damping axis line Vr1 (i.e., the spring axis line Vr1) extending in the up-down direction, and a damping axis line Ho1 perpendicular to the damping axis line Vr1 (i.e., the spring axis line Vr1) extending in the up-down direction.

As best seen in FIG. 5, the damping axis line Ho1 perpendicular to the damping axis line Vr1 is an axis line extending in a direction perpendicular to the damping axis line Vr1.

To describe particularly, the power-source side mount 64 has a first attachment member 101 attached to the engine 51 via bracket 74, a second tubular attachment member 102 attached to the vehicle body 20, an elastic member 103 connecting between the first attachment member 101 and the second attachment member 102, a diaphragm 104 fixed to the second attachment member 102 by being spaced from the elastic member 103, a first liquid chamber 105 partitioned by at least the elastic member 103 and the diaphragm 104, and a partitioning member 108 fixed to the second attachment member 102 to partition the first liquid chamber 105 into a main liquid chamber 106, which is placed at the side of the elastic member 103, and an auxiliary chamber 107 placed at the diaphragm 104.

The first attachment member 101, the second attachment member 102, the elastic member 103, the diaphragm 104, the first liquid chamber 105, and the partitioning member 108 are arranged on the damping axis line Vr1 in the up-down axial direction in the power-source side mount 64. The main liquid chamber 106 and the auxiliary liquid chamber 107 are spaces into each of which operating fluid Lq is encapsulated.

The first attachment member 101 is a metallic member attached to the engine 51 through the engine bracket 74.

The second attachment member 102 includes a metallic tube member 111 to which the elastic member 103 is connected, a metallic bracket 112 into which the metallic tube member 111 is pressed, and a resin bracket 113 configured to support the metallic bracket 112 and to be attached to the vehicle body 20.

The elastic member 103 is a rubber block adapted to elastically deform to absorb vibrations transmitted between the first attachment member 101 and the second attachment member 102.

The elastic member 103 is a member having a part formed integrally with the first attachment member 101 so that the shape of the top portion to the bottom portion of this part is substantially cylindrical. The elastic member 103 also has a lower cavity portion 121, which is largely opened downwardly from the bottom portion of this part, and a pair of front and rear or a pair of left and right side cavity portions (a first side cavity portion 122 and a second side cavity portion 123) largely opened in the lateral direction from the side portions of this part.

As illustrated in FIG. 5, one of straight lines passing through the shaft center Vr1 (i.e., the damping axis line Vr1 in the up-down axial direction) of the elastic member 103 is a first line L1, when the elastic member 103 is viewed in the up-down direction. A straight line passing through the shaft center Vr1 and being perpendicular to the first line L1 is a second line L2. The first side cavity portion 122 and the second side cavity portion 123 are axisymmetrical with respect to the first line L1.

The second line L2 is a damping axis line perpendicular to the damping axis line Vr1 extending in the up-down axial direction. Hereinafter, the second line L2 is referred to as the "damping axis line H01 perpendicular to the damping axis line Vr1 extending in the up-down axial direction".

As illustrated in FIG. 4, the diaphragm 104 is formed of a thin-film-like rubber material that closes the bottom (at the side of the vehicle body 20) of the metallic tube member 111 and is curved to be convex toward the partitioning member 108. The diaphragm 104 can be displaced in the axial direction of the power-source side mount 64.

The partitioning member 108 is a disk-like member in the outer circumferential surface of which a communicating path 109 is formed. The communicating path 109 has the function of an orifice communicating between the main liquid chamber 106 and the auxiliary liquid chamber 107. Hereunder, the communicating path 109 is referred to as the "first orifice 109".

As illustrated in FIGS. 4 and 5, the metallic tube member 111 is a member into which the elastic member 103, the diaphragm 104, the partitioning member 108, and a side portion partitioning member 130 are assembled.

The side portion partitioning member 130 is attached to the elastic member 103 by being fit thereinto while liquid-sealability is assured. A first side portion liquid chamber 131 is constituted by the side portion partitioning member 130 and the first side portion cavity portion 122. A second side portion liquid chamber 132 is constituted by a side partitioning 130 and a second side portion cavity portion 123. A second liquid chamber 133 is constituted by the combination of the first side portion liquid chamber 131 and the second side portion liquid chamber 132. The second liquid chamber 133 is a space into which the operating liquid Lq is encapsulated.

The side portion partitioning member 130 is a member having a substantially C-shaped in plan view and has an outer circumferential surface in which a labyrinthine communicating path 134 is formed. The communicating path 134 has the function of an orifice communicating between the first side portion liquid chamber 131 and the second side portion liquid chamber 132. Hereunder, the communicating path 134 is referred to as the "second orifice 134".

An end part 134a of the second orifice 134 is a through hole formed in the vicinity of and at an upper part of one 135 of C-shaped cutout ends to penetrate in and out. The other end part 134b of the second orifice 134 is a through hole formed in an obliquely lower part of an end 134a of the side partitioning member 130 to penetrate in and out.

Such a second orifice 134 extends from the one end part 134a along the outer circumferential surface of the side portion partitioning member 130 to turn clockwise in plan view. Then, the second orifice 134 extends downwardly in the vicinity of the other cutout end 136. Further, the second orifice 34 extends to turn counterclockwise in plan view toward the one of the cutout ends 135. On the way, the second orifice 34 extends to turn slightly upwardly. Then, the second orifice 34 continues to the other end 134b. The one end 134a communicates with the first side cavity portion 122, while the other end 134b communicates with the second side cavity portion 123.

Next, a vibration-damping action due the power-source side mount 64 of the above configuration is described below.

As illustrated in FIG. 4, in a case where axial vibrations (vibrations in the direction of the shaft center Vr1) act from the engine 51 (see FIG. 1) on the power-source side mount 64, the operating liquid Lq flows between the main liquid chamber 106 and the auxiliary liquid chamber 107 through the first orifice 109. Also, the elastic member 103 elastically deforms. Consequently, the vibrations can be attenuated.

Also, in a case where the vibrations and the load of the damping axis line Ho1 perpendicular to the damping axis line Vr1 in the up-down axial direction act on the power-source side mount 64 from the engine 51, the operating liquid Lq flows between the first side portion liquid chamber 101 and the second side portion liquid chamber 102 through the second orifice 134. Also, the elastic member 103 elastically deforms. Thus, the vibrations and the load can be absorbed.

Next, the arrangement relationship between the power-source side mount 64 and the speed-reduction-gear side mount 65 of the above configuration is described below.

As illustrated in FIGS. 1 to 3, the speed-reduction-gear side mount 65 has substantially the same configuration as that of the power-source side mount 64 and is disposed by turning the configuration of the power-source side mount 64 upside down. That is, the speed-reduction-gear side mount 65 is configured so that the first attachment member 101 (see FIG. 4) is attached to the left upper frame 22 of the vehicle body 20, and that the second attachment member 102 (see FIG. 4) is attached to the transmission 52 through a speed-reduction-gear bracket 75.

Figure 6:
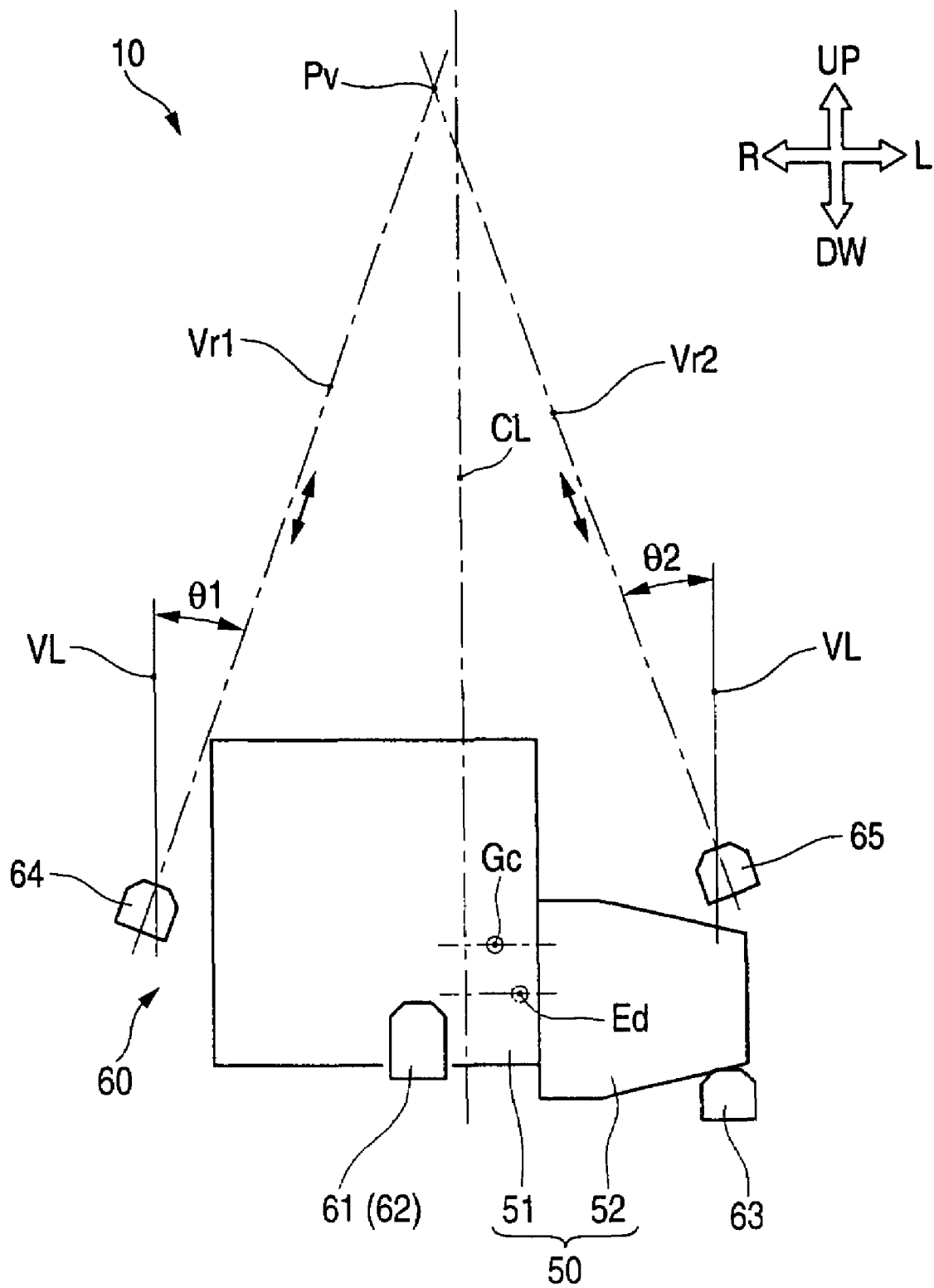
FIG. 6 is a schematic front view illustrating a vehicle power unit supporting apparatus according to the invention.
Figure 7:
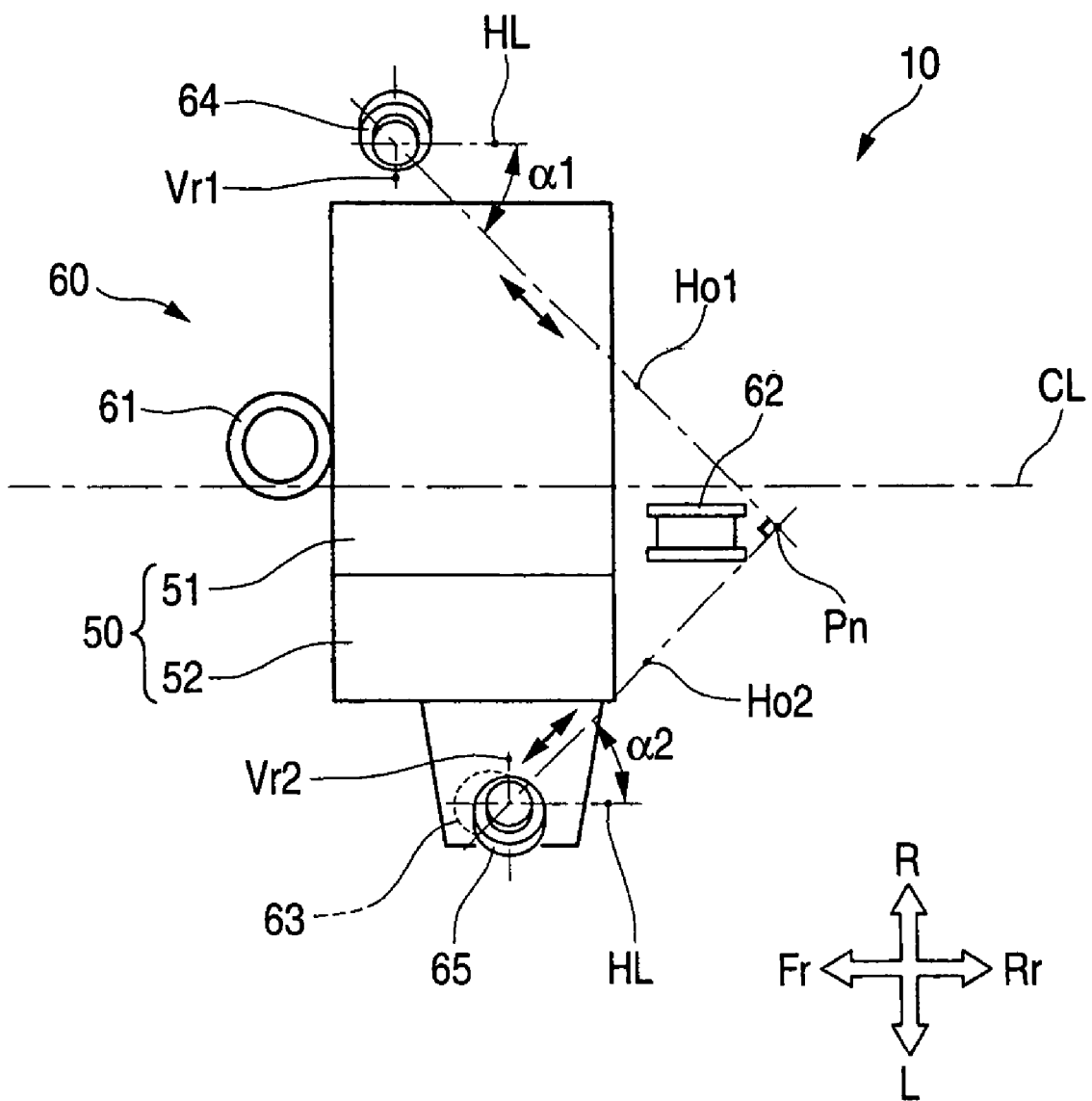
FIG. 7 is a schematic plan view illustrating the vehicle power unit supporting apparatus according to the invention.
Figure 9A:
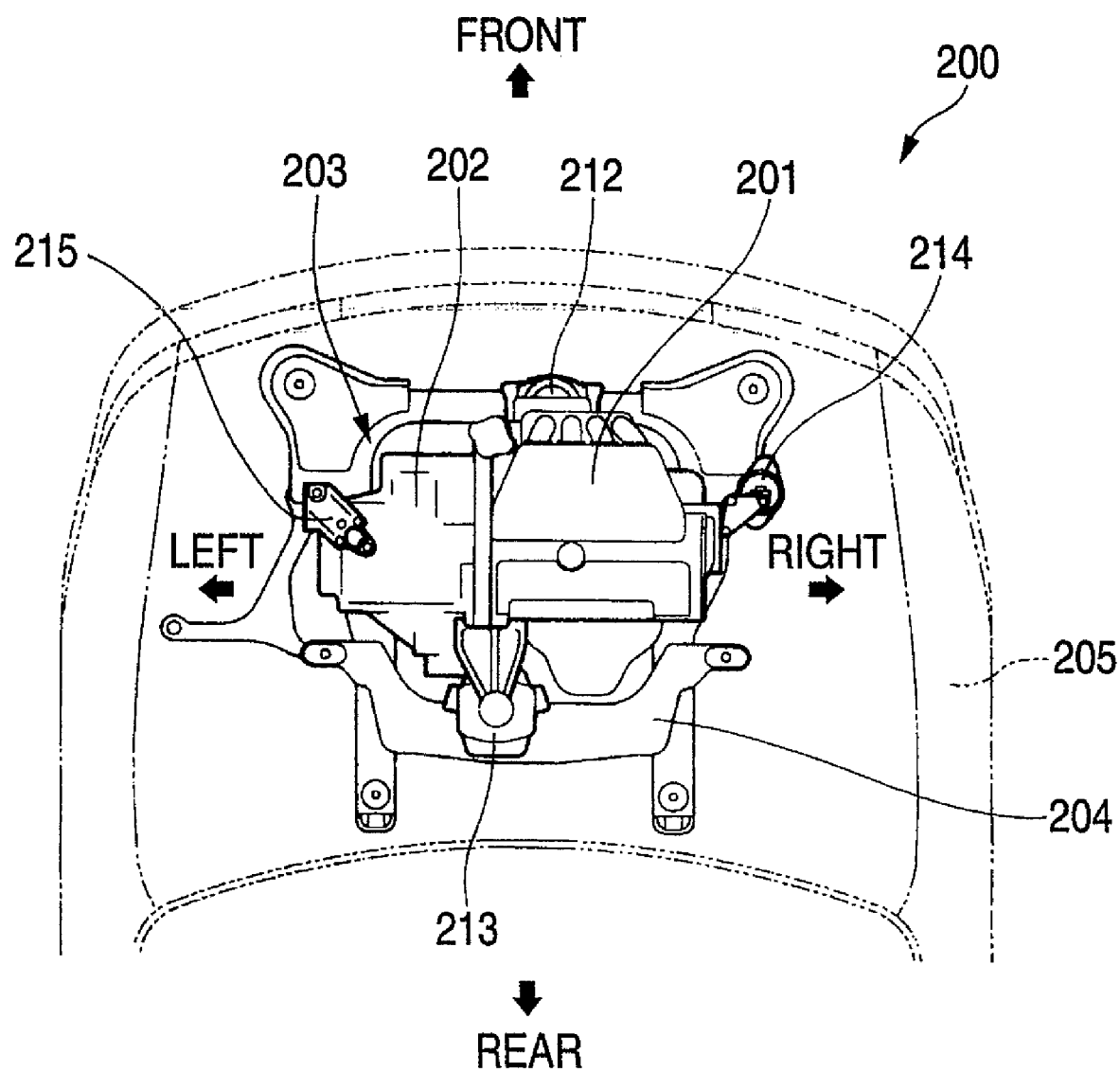
FIGS. 9A and 9B are explanatory views illustrating a conventional vehicle power unit supporting apparatus.
Figure 9B:
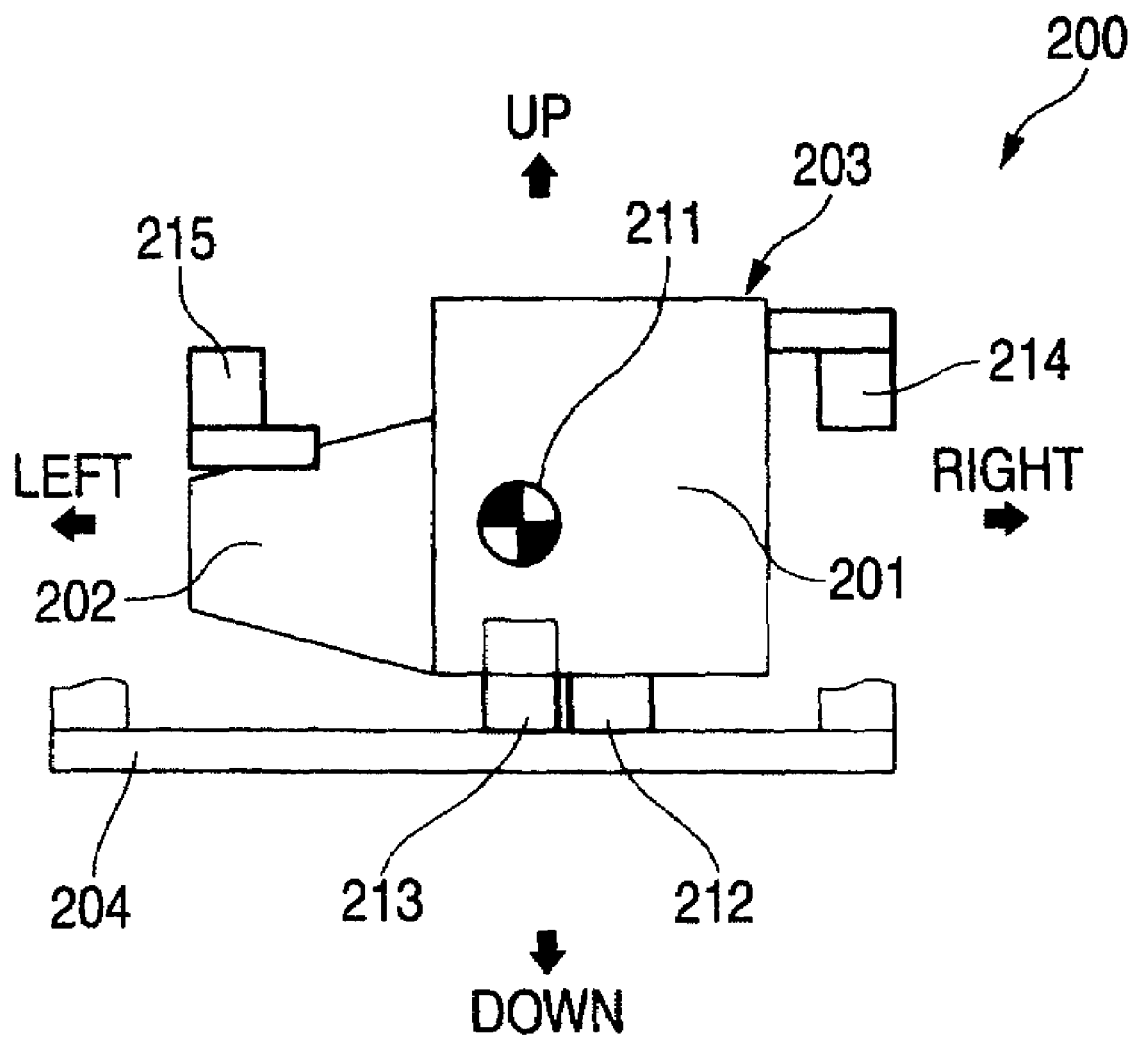

FIG. 6 is a schematic front view illustrating a vehicle power unit supporting apparatus according to the invention. The vehicle power unit supporting apparatus is schematically illustrated in FIG. 6 in consideration of the corresponding relation between the vehicle power unit supporting apparatus respectively illustrated in FIGS. 6 and 1. FIG. 7 is a schematic plan view illustrating the vehicle power unit supporting apparatus according to the invention. The vehicle power unit supporting apparatus is schematically illustrated in FIG. 7 in consideration of the corresponding relation between the vehicle power unit supporting apparatus respectively illustrated in FIGS. 7 and 1.

Although described above, as illustrated in FIGS. 6 and 7, the power-source side mount 64 has the damping axis line Vr1 (i.e., the spring axis line Vr1, or the elastic axis line Vr1) extending in the predetermined up-down axis line, and the damping axis line Ho1 perpendicular to the damping axis line Vr1 in the up-down axial direction.

Further, as illustrated in FIGS. 6 and 7, the speed-reduction-gear side mount 65 has the damping axis line Vr2 (i.e., the spring axis line Vr2, or the elastic axis line Vr2) extending in the predetermined up-down axis line, and the damping axis line Ho2 perpendicular to the damping axis line Vr2 in the up-down axial direction.

The damping axis line Vr2 extending in the up-down axial direction of the speed-reduction-gear side is the same as the damping axis line Vr1 extending in the up-down axial direction of the power-source side mount 64. The damping axis line Ho2 perpendicular to the damping axis line Vr2 in the up-down axial direction of the speed-reduction-gear side mount 65 is the same as the damping axis line Ho1 perpendicular to the damping axis line Vr1 in the up-down axial direction of the power-source side mount 64.

Incidentally, the damping axis lines Vr1, Vr2, Ho1, and Ho2 are axis lines extending in the damping directions of the mounts 64 and 65, respectively. The damping axis lines are referred to also as the spring axis lines or the elastic axis lines. The spring axis line and the elastic axis line are axis lines (or center lines) extending in the elastic direction of in each of the mounts 64 and 65. The spring axis line and the elastic axis line are such that the direction of the load coincides with the direction of the elastic displacement to thereby cause no angular displacement.

As illustrate in FIG. 6, the spring axis line Vr1 of the power-source side mount 64 and a spring axis line Vr2 of the speed-reduction-gear side mount 65 are inclined to intersect with each other at a position higher than the position of the center Gc of gravity of the power unit when the vehicle is viewed from front.

Particularly, the spring axis line Vr1 of the power-source side mount 64 is inclined to a vertical line VL at an angle of inclination θ1 toward the vehicle center line CL upwardly from the vehicle body. The spring axis line Vr2 of the speed-reduction-gear side mount 65 is inclined to the vertical line VL at an angle of inclination θ2 toward the vehicle center line CL upwardly from the vehicle body. For example, the angle of inclination θ1 is equal to the angle of inclination θ2. The intersection point Pv of the damping axis lines extending in the up-down axial direction is placed above the position of the center Gc of gravity of the power unit 50.

As described above, the power unit supporting apparatus 60 is configured so that the spring axis line Vr1 of the power-source side 64 (the right side mount 64) and the spring axis line Vr2 of the speed-reduction-gear side 65 (the left side mount 65), which extend above the center Gc of gravity of the power unit 50, intersect with each other at a position higher than the center Gc of gravity of the power unit 50.

Naturally, the intersection point Pv of the spring axis lines Vr1 and Vr2 extending in the up-down axial direction is placed above the position of the center Gc of gravity of the power unit 50. Consequently, the elastic center determined only from the power-source side mount 64 and the speed-reduction-gear side mount 65 is the position of the intersection point Pv.

A composite elastic center Ed of all the mounts 61 to 65, that is, the elastic center Ed of the power unit supporting apparatus 60 can be freely set at an optimal height by appropriately setting the height of the intersection point Pv.

As illustrated in FIGS. 1 and 6, according to the invention, the elastic center Ed of the entire power unit supporting apparatus 60 is downwardly moved, and is set at a position lower than the position of the center Gc of gravity of the power unit 50. That is, the height of the intersection point Pv of the damping axis lines Vr1 and Vr2 is set so that the elastic center Ed of the entire power unit supporting apparatus 60 is placed at a position lower than the position of the center Gc of the power unit 50.

As illustrated in FIG. 7, the damping axis lines Ho1 and Ho2, which are perpendicular to the damping axis lines Vr1 and Vr2, respectively, are inclined to the front-rear direction and the vehicle width direction of the vehicle 10, when the vehicle 10 is viewed from above. Additionally, the damping axis lines Ho1 and Ho2, which are perpendicular to the damping axis lines Vr1 and Vr2, respectively, are inclined to intersect with each other at a right angle.

Particularly, a horizontal line HL is parallel to the vehicle width center line CL extending in the front-rear direction of the vehicle body. The damping axis line Ho1 perpendicular to the damping axis line Vr1 in the up-down axial direction corresponding to the power-source side mount 64 is inclined to the horizontal line HL at an angle of inclination α1 toward the vehicle width center line CL and to the rear of the vehicle body. The damping axis line Ho2 perpendicular to the damping axis line Vr2 in the up-down axial direction corresponding to the speed-reduction-gear side mount 65 is inclined to the horizontal line HL at an angle of inclination α2 toward the vehicle width center line CL and to the rear of the vehicle body. For example, the angle of inclination α1 is 45°. The angle of inclination α2 is equal to the angle of inclination α1. The intersection point of the damping axis lines Ho1 and Ho2, which are perpendicular to the damping axis lines Vr1 and Vr2, respectively, is a point Ph.

FIGS. 8A and 8B are views illustrating an operation of a vehicle having the power unit supporting apparatus according to the conventional arrangement and the present invention, respectively. The vehicle viewed from the front is schematically illustrated in consideration of the corresponding relationship between the vehicle illustrated in FIG. 6 and that illustrated in FIGS. 8A and 8B. FIG. 8A illustrates a vehicle 10A in a comparative example. FIG. 8B illustrates a vehicle 10 according to the inventive embodiment.

As illustrated in FIG. 8A, the power unit supporting apparatus 60 provided in the vehicle 10A of the comparative example is configured so that the composite elastic center Ed of all the mounts 61 to 63, 64A, and 65A is set at a position higher than the position of the center Gc of the power unit 50. Left and right side mounts 64A and 65A are directed to a vertical direction.

When the vehicle 10A is turned leftwardly or rightwardly, as viewed in FIG. 8A, a centrifugal force is applied to the vehicle 10A during the turn. Thus, among suspensions (not shown) respectively suspending left and right wheels 81L and 81R, dampers and springs provided at the outer side of the turn are compressed. Conversely, dampers and springs provided at the inner side of the turn are stretched. Consequently, the vehicle 10A performs what is called a roll motion (i.e., a rolling motion or a turning movement around a front-rear axis of the vehicle 20, which passes through the center Gc of gravity of the vehicle). That is, a part of the vehicle, which is provided at the outer side of the turn, is sank, while the opposite part of the vehicle, which is provided at the inner side of the turn, is inclined to be raised. When the vehicle 10A performs a turning run, the vehicle body 20 performs a roll motion in a direction opposite to a turning direction.

For example, when the vehicle 10A is turned leftwardly with respect to a direction of movement, the vehicle body 20 performs a counterclockwise roll motion (i.e., rolling in the direction of arrow Br), as viewed in FIG. 8A. That is, the rolling direction (the direction of a turning movement around the front-rear axis of the vehicle 20) of the vehicle body 20 is the direction of arrow Br. At that time, the power unit 50 is located at the outer side of the turn. Also, a leftward centrifugal force fi is applied to the power unit 50.

Meanwhile, in the vehicle 10A of the comparative example, the position of the composite elastic center of all the mounts 61 to 63, 64A, and 65A is located at a position higher than the position of the center Gc of gravity of the power unit 50. A moment, whose direction changes clockwise angle (i.e., corresponds to a direction of arrow Pr1) around the elastic center Ed, acts on the power unit 50. Thus, the power unit 50 performs a roll motion whose direction changes clockwise around the elastic center Ed (i.e., corresponds to the direction of arrow Pr1). The rolling direction Pr1 of the power unit 50 is opposite to the rolling direction Br of the vehicle body 20. Therefore, the roll motion of the power unit 50 cancels that of the vehicle body 20. To sufficiently enhance the driving stability and the riding comfort of the vehicle 10A, it is desirable to suppress the influence of the behavior (i.e., a cancellation action) of the power unit 50 serving as a heavy load.

In contrast, as illustrated in FIG. 8B, in the case of the power unit supporting apparatus 60 according to the present embodiment, the damping axis line Vr1 extending in the up-down axial direction of the power-source side mount 64 and the damping axis line Vr2 extending in the up-down axial direction of the speed-reduction-gear side mount 65 are inclined upwardly toward the vehicle width center side so that the damping axis lines Vr1 and Vr2 intersect with each other above the center Gc of gravity of the power unit 50. Consequently, the composite elastic center Ed of all the mounts 61 to 65 are set to be lower than the center Gc of gravity of the power unit 50.

Thus, a moment, whose direction changes clockwise around the elastic center Ed (i.e., corresponds to a direction of arrow Pr2), as viewed in FIG. 8B, acts on the power unit 50. Consequently, the power unit 50 performs a roll motion, whose direction changes counterclockwise around the elastic center Ed (i.e., corresponds to a direction of arrow Pr2), as viewed in FIG. 8B, with respect to the vehicle body 20. The rolling direction (i.e., the direction of arrow Pr2) of the power unit 50 is the same as that Br of a vehicle body 20. Therefore, the roll motion of the vehicle body 20 is not cancelled by that of the roll motion by the power unit 50.

Thus, when the vehicle 10 is turned, the direction of the moment due to a centrifugal force fi applied to the power unit 60 can be adjusted to the rolling direction of the vehicle body. Consequently, the rolling direction Pr2 of the power unit 50 can be adjusted to the rolling direction Br of the vehicle body 20. Therefore, the rolling motion of the vehicle 20 is not cancelled by the rolling motion of the power unit 50. Thus, the influence of the behavior of the power unit 50, which serves as a heavy load during driving, on vehicle body 20 can be suppressed. Accordingly, the driving stability of the vehicle 10 can be further enhanced. The riding comfort of the vehicle 10 can be further enhanced.

Incidentally, the configuration of the vehicle 10 according to the embodiment of the invention is not limited to the configuration in which the power unit 50 is accommodated in the power unit accommodating chamber 31 provided in the front portion of the vehicle body 20. For example, the vehicle 10 may have a configuration in which the power unit 50 is accommodated in the power unit accommodating chamber 31 provided in the central portion of the vehicle body 20.

Also, the configuration of the power unit 50 according to the embodiment of the invention is not limited to a configuration in which the power unit 50 is mounted in the vehicle body 20 through the front subframe 40. The power unit 50 may be directly mounted on the vehicle body 20, Additionally, the power source 51 according to the embodiment is not limited to an engine. For example, the power source 51 may be an electric motor. The speed reduction gear 52 according to the embodiment is not limited to the transmission. The speed reduction gear 52 may have only a speed reduction mechanism.

Also, it is sufficient that the power unit supporting apparatus 60 has the configuration in which the power unit 50 constructed by connecting the speed reduction gear 52 to an end of the power source 51 is supported on the vehicle body 20 by at least the left side mount 64 and the right side mount 65 disposed on both sides in the vehicle width direction of the power unit 50, respectively.

Also, it is sufficient that each of the left side mount 64 and the right side mount 65 has a two-way damping structure which includes an associated one of the damping axis lines Vr1 and Vr2 extending in the up-down axial direction and an associated one of the damping axis line Ho1 and Ho2 respectively perpendicular to the damping axis lines Vr1 and Vr2. The configuration of the apparatus according to the invention is not limited to the configuration employing the liquid sealed mount. For example, the apparatus according to the invention may employ a rubber mount instead of the liquid sealed mount.

Additionally, each of the left side mount 64 and the right side mount 65 may be configured so that the first attachment member 101 is attached to one of the power source 51 (or the speed reduction gear 52) and the vehicle body 20, and that the second attachment member 102 is attached to the other of the power source 51 (or the speed reduction gear 52) and the vehicle body 20.

Additionally, the magnitudes of the angle θ1 of inclination of the damping axis line Vr1 extending in the up-down axial direction, the angle θ2 of inclination of the damping axis line Vr2 extending in the up-down axial direction, the angle α1 of inclination of the damping axis line Ho1 perpendicular to the damping axis line Vr1, and the angle α2 of inclination of the damping axis line Ho2 perpendicular to the damping axis line Vr2 are optional. For example, the angles can be set so that each of the intersection points Pv and Ph coincides with the vehicle width center line CL, or that each of the intersection points Pv and Ph coincides with a line which passes through the center Gc of gravity of the power unit 50 and is parallel to the vehicle width center line CL.

The power unit supporting apparatus 60 according to the invention is suitable for use in a vehicle in which a transversely-mounted power unit 50 configured to arrange a power source 51 and a speed reduction gear 52 in a vehicle width direction and to connect the power source 51 and the speed reduction gear 52 to each other is disposed at a front portion or a middle portion of a vehicle body 20, and in which the static load of the power unit 50 is supported by static load supporting mounts 61 to 63 disposed at positions lower than the position of the center Gc of gravity of the power unit 50.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A vehicle power unit supporting apparatus that supports a power unit, which is housed in a power unit accommodating chamber of a vehicle and has a configuration in which a speed reduction gear is connected to an end portion of a power source, the supporting apparatus comprising:

left and right side mounts that support the power unit on the vehicle body, and respectively disposed on both sides in a vehicle width direction of the power unit at a position higher than a position of a center of gravity of the power unit such that the left and right side mounts do not receive the static load of the power unit, wherein a spring axis line of the left side mount and a spring axis line of the right side mount are inclined to intersect with each other at a position higher than the position of the center of gravity of the power unit when the vehicle is viewed from a front portion thereof, and an elastic center of the entirety of the power unit supporting apparatus is set to be at a position lower than the position of the center of gravity of the power unit, whereby a rolling direction of the power unit is adjusted to a rolling direction of the vehicle body when the vehicle turns.

2. The vehicle power unit supporting apparatus according to claim 1, wherein the power source and the speed reduction gear are arranged in the vehicle width direction and are connected to each other.

3. A supporting structure for supporting a power unit of a vehicle, said supporting structure comprising:

a pair of mounts respectively disposed on left and right sides of a power unit accommodating chamber in a vehicle body; said pair of mounts supporting the power unit thereon;

each of said mounts being disposed at a position higher than a position of center of gravity of the power unit such that the left and right side mounts do not receive the static load of the power unit;

wherein spring axis lines of said mounts are inclined so as to intersect with each other at a position higher than the position of the center of gravity of the power unit when the vehicle is viewed in a longitudinal direction;

an elastic center of the entire supporting structure is set at a position lower than the position of the center of gravity of the power unit, whereby a rolling direction of the power unit is adjusted to a rolling direction of the vehicle body when the vehicle turns;

wherein said vehicle is a car.

4. A supporting structure for supporting a power unit of a vehicle according to claim 3, wherein the power unit accommodating chamber comprises a plurality of frames of the vehicle body; wherein each of said mounts is disposed on one of said plurality of frames.

5. A supporting structure for supporting a power unit of a vehicle according to claim 3, wherein the power unit includes an engine and a speed reduction gear connected to the engine; and wherein said engine is arranged with a longitudinal axis thereof oriented in the vehicle width direction.

6. A supporting structure for supporting a power unit of a vehicle according to claim 5, wherein said speed reduction gear comprises a speed reduction mechanism.

7. A supporting structure for supporting a power unit of a vehicle according to claim 5, wherein said speed reduction gear is supported by at least one of said mounts.

8. A supporting structure for supporting a power unit of a vehicle according to claim 3, wherein each of said mounts includes a two-way dampening structure.

9. A supporting structure for supporting a power unit of a vehicle according to claim 3, wherein each of said mounts is a liquid sealed structure.

10. A supporting structure for supporting a power unit of a vehicle according to claim 3, wherein each of said mounts comprises rubber.

11. A vehicle comprising
a power unit comprising a power source and a speed reduction gear connected to said power source;
a vehicle body having a plurality of frames; and
a supporting structure having a plurality of mounts for supporting said power source and said speed reduction gear; said supporting structure being mounted on said vehicle body,
said plurality of mounts comprising a power-source front lower portion side mount, a power-source rear portion side mount, a speed-reduction-gear lower side mount, a power-source side mount and a speed-reduction-gear side mount;
wherein:
said power-source side mount and said speed-reduction-gear side mount are respectively disposed on both sides in a vehicle width direction on said vehicle body; said power-source side mount and said speed-reduction-gear side mount are configured to support the power unit thereon;
said power-source side mount and said speed-reduction-gear side mount are disposed at a position higher than a position of center of gravity of the power unit such that the left and right side mounts do not receive the static load of the power unit;
respective spring axis lines of said power-source side mount and said speed-reduction-gear side mount are inclined so as to intersect with each other at a position higher than the position of the center of gravity of the power unit; and
a composite elastic center of said plurality of mounts is set at a position lower than the position of the center of gravity of the power unit, whereby a rolling direction of the power unit is adjusted to a rolling direction of the vehicle body when the vehicle turns.

12. A vehicle according to claim 11, wherein an angle of inclination from a vertical plane of said spring axis line of said power-source side mount is substantially equal to that of said speed-reduction-gear side mount.

13. A vehicle according to claim 11, wherein said power-source side mount and said speed-reduction-gear side mount are each adjustable to achieve a desired location of said composite elastic center.

14. A vehicle according to claim 11, wherein said power source is an internal combustion engine.

15. A vehicle according to claim 11, wherein said power source is an electric motor.

16. A vehicle according to claim 11, wherein said speed reduction gear comprises a speed reduction mechanism.

17. A vehicle according to claim 11, wherein said speed reduction gear is supported by at least one of said power-source side mount and said speed-reduction-gear side mount.

18. A vehicle according to claim 11, wherein each of said power-source side mount and said speed-reduction-gear side mount includes a two-way dampening structure.

19. A vehicle according to claim 11, wherein each of said power-source side mount and said speed-reduction-gear side mount is a liquid sealed structure.

20. A vehicle according to claim 11, wherein each of said power-source side mount and said speed-reduction-gear side mount comprises rubber.

* * * * *